United States Patent [19]

Taylor

[11] 3,870,194
[45] Mar. 11, 1975

[54] APPARATUS FOR ORIENTING AND FEEDING ARTICLES

[76] Inventor: Clarence Taylor, 28 Woodside Dr., Rochester, N.Y. 14526

[22] Filed: Jan. 28, 1974

[21] Appl. No.: 437,156

[52] U.S. Cl. .............................. 221/160, 221/167
[51] Int. Cl. ........................... B23q 7/02, B65h 9/00
[58] Field of Search .......................... 221/159–161, 221/167–170, 182; 194/97 B

[56] References Cited
UNITED STATES PATENTS

| | | | |
|---|---|---|---|
| 2,326,673 | 8/1943 | Patzer et al. ...................... | 194/97 B |
| 2,639,034 | 5/1953 | Roeber .............................. | 221/160 |
| 3,145,875 | 8/1964 | Medoff et al. ..................... | 221/167 |
| 3,337,089 | 8/1967 | Bronfman .......................... | 221/160 |

Primary Examiner—Robert B. Reeves
Assistant Examiner—Francis J. Bartuska

[57] ABSTRACT

A method and apparatus for selecting an article from a supply of randomly positioned articles and sensing the orientation of the selected article. If the article is properly oriented, it is fed to a work station; if the article is improperly oriented, it is returned to the supply. This sensing mechanism is capable of sensing the proper orientation of different sized articles without any modification. The articles handled by the article feeding mechanism are preferably of the type having opposite side surfaces lying in substantially parallel planes with one surface provided with an indentation or recess of greater depth than the other surface such as buttons.

18 Claims, 12 Drawing Figures

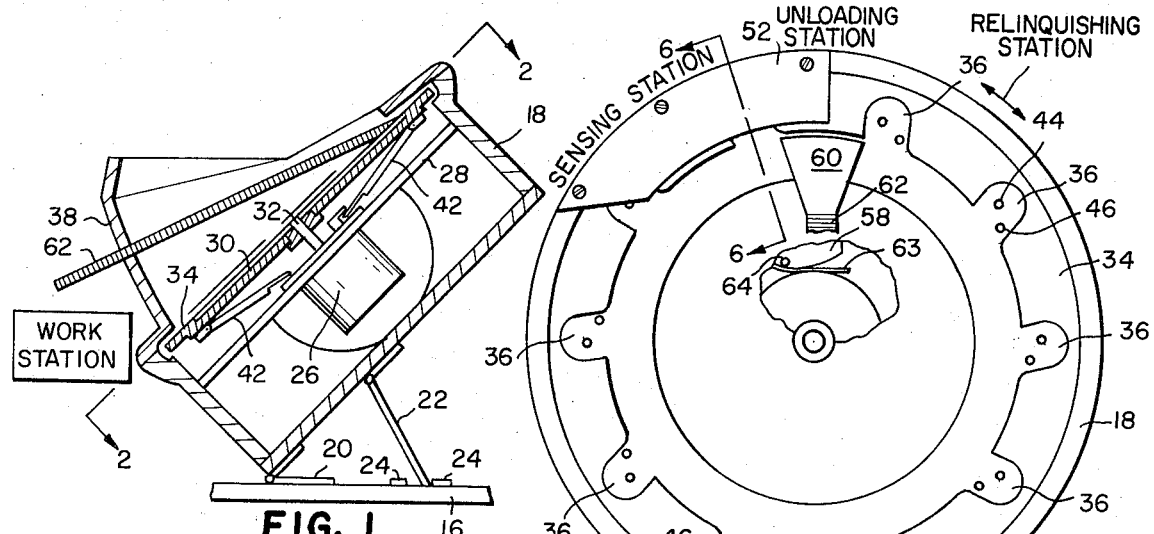
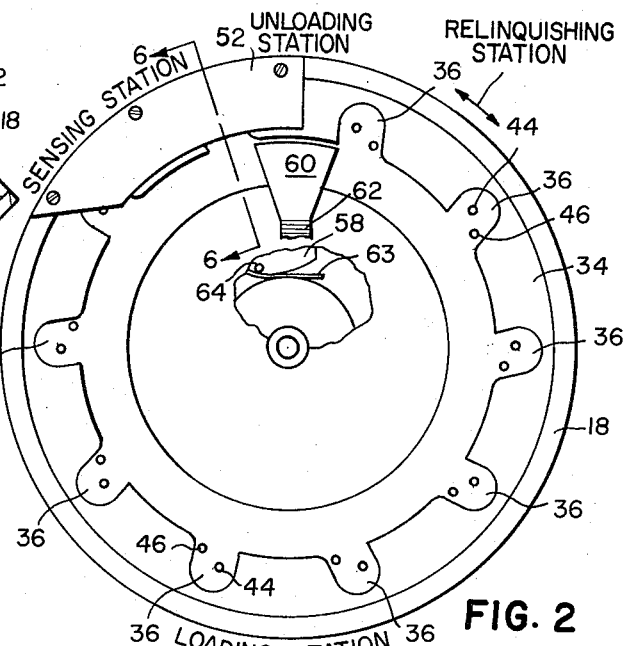
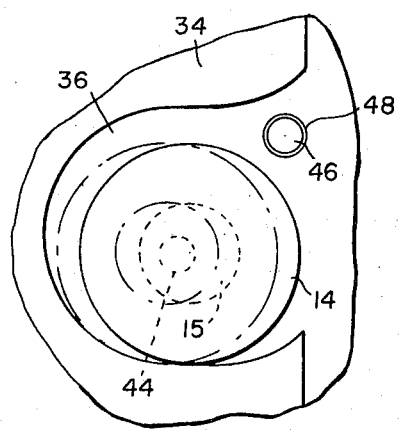
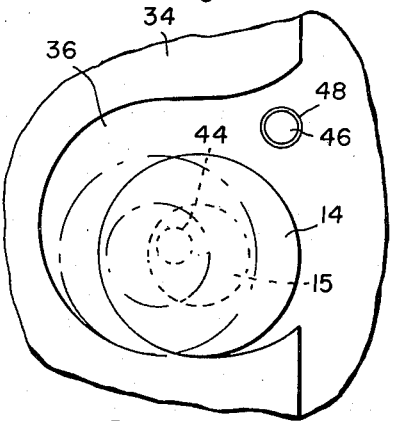
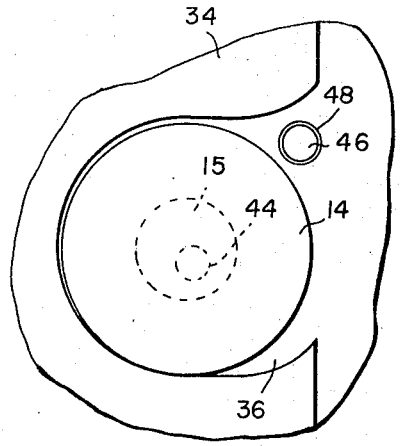
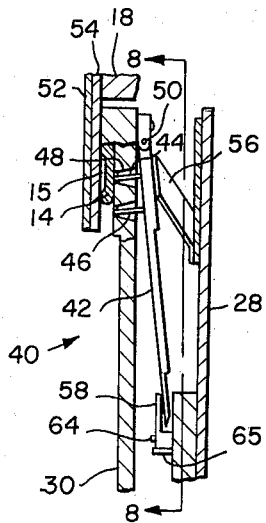
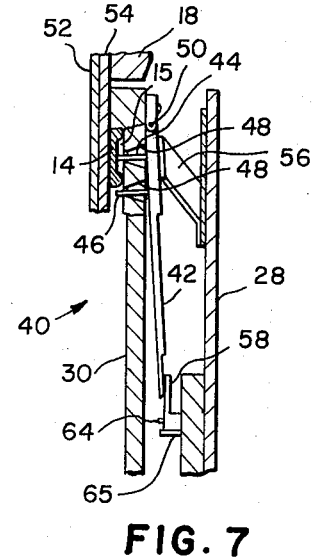
FIG. 1 — FIG. 2 — FIG. 3 — FIG. 4 — FIG. 5 — FIG. 6 — FIG. 7

3,870,194

APPARATUS FOR ORIENTING AND FEEDING ARTICLES

BACKGROUND OF THE INVENTION

1. Field of the Invention

This invention relates generally to article feeding, and more specifically to a method and apparatus for sensing the orientation of an article, and if the article is properly oriented, feeding it to a work station.

2. Description of the Prior Art

Article feeding mechanisms of the electrical vibratory type are well known in the art. In such vibratory devices, a supply of randomly oriented articles are constantly advanced in small steps in a vibrating bowl. The bowl vibrates through a small angle causing the outermost articles to eventually be forced serially onto a transport ledge in some random orientation. As the articles travel along the ledge in single file, those that are not positioned in the desired or proper orientation are forced by cam surfaces or air jets back into the bowl. The articles that are properly oriented are transported into a chute leading to a work station. Although such vibratory devices operate satisfactorily, they suffer from the disadvantage that each of the devices is adapted to properly orient and feed only an article of a specific size. In order to handle articles of a different size, the vibratory device must be modified. In some instances, such modifications are extensive and costly. A further disadvantage of the vibratory device is that the bowl due to a method of imparting vibration must be horizontally oriented. Consequently, it is a laborious operation to remove the articles remaining in the bowl following completion of an operation. Excessive noise is an additional shortcoming of such prior known electrical vibratory feeding devices.

SUMMARY OF THE INVENTION

In accordance with a preferred embodiment of the present invention, a method and apparatus is disclosed for sensing an article to determine its orientation. If the sensed article is properly oriented, it is fed to a work station; if the article is improperly oriented, it is returned to an article supply. The article feeding mechanism comprises a movable work table having at least one article receiving pocket which is moved successively through loading, sensing, unloading and relinquishing stations. Means are provided for loading an article in the pocket in some random orientation at the loading station. Sensing means are provided associated with each of the pockets for sensing an article therein. The sensing means is movable between a retracted position clear of the pocket to permit feeding an article from the pocket, and an extended position extending into the pocket to retain an article therein. Means are provided at the sensing station to provide a back-stop for one side of the article. Other means are provided for biasing the sensing means toward the back-stop and into its extended position. The sensing means is prevented from moving from its retracted position to its extended position by a properly oriented article at the sensing station. Lastly, holding means are provided at the unloading station for releasably holding the sensing means in its retracted position when a properly oriented article is at the sensing station. Accordingly, the properly oriented article is free for feeding by gravity from the pocket to a work station. The holding means is further adapted to releasably hold the sensing means in its extended position when an improperly oriented article or no article is present at the sensing station. Accordingly, the sensing means retains the improperly oriented article in the pocket for passage through the unloading station to the relinquishing station.

One of the objects and advantages of the present invention is to provide an improved article feeding mechanism capable of feeding any one of a number of different articles without modification of the mechanism.

Another object and advantage of the present invention is to provide an improved article feeding mechanism in which the supply of articles in the mechanism can be readily removed or cleaned out.

Another object and advantage of the present invention is to provide an improved article feeding mechanism that is quieter in operation than prior known feeding mechanisms.

Still another object and advantage of the present invention is to provide an improved article feeding mechanism that is of simple design and construction, thoroughly reliable and efficient in operation, and economical to manufacture.

Another object of the invention is to provide a method and apparatus for selecting an article from a supply of randomly oriented articles, and sensing the orientation of the selected article. If the article is properly oriented, it is fed to a work station; if the article is improperly oriented, it is returned to the supply.

The invention and its objects and advantages will become more apparent from the detailed description of the preferred embodiments presented below.

BRIEF DESCRIPTION OF THE DRAWINGS

FIG. 1 is a side elevational view of a preferred embodiment of the article feeding mechanism of this invention;

FIG. 2 is an enlarged elevational view of the article feeding mechanism of FIG. 1 looking at it substantially from line 2—2 of FIG. 1;

FIG. 3 is an enlarged segmental view of one of the pockets of FIG. 2 illustrating possible positions of an article therein of one size;

FIG. 4 is a view similar to FIG. 3 illustrating possible positions of an article of a slightly larger size;

FIG. 5 is a view similar to FIGS. 3 and 4 illustrating the position of an article of the largest size;

FIG. 6 is an enlarged section view taken substantially along line 6—6 of FIG. 2 illustrating the position of the sensing mechanism at the sensing station when a properly oriented article is sensed;

FIG. 7 is a view similar to FIG. 6 illustrating the position of the sensing mechanism at the sensing station when an improperly oriented article is sensed;

DESCRIPTION OF THE PREFERRED EMBODIMENTS

Figure 8:
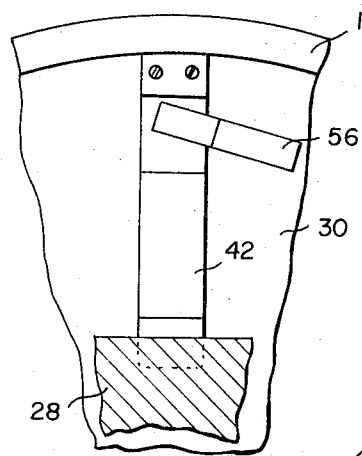
FIG. 8 is a section view taken substantially along line 8—8 of FIG. 6.
Figure 9:
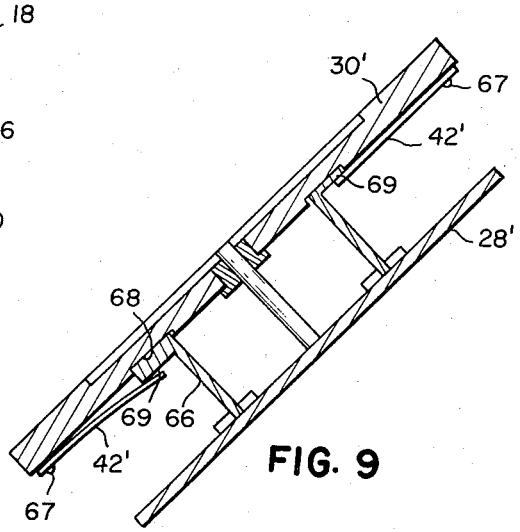
FIG. 9 is a segmental view in section similar to FIG. 1 illustrating another embodiment of the sensing mechanism.

Because article feeding mechanisms are well known, the present description will be directed in particular to elements forming part of, or cooperating more directly with, apparatus in accordance with the present invention. Elements of the article feeding mechanism not specifically shown or described should be understood to be selectable from those known in the art.

With reference to the drawings, an article feeding mechanism is disclosed for feeding properly oriented articles 14 (FIGS. 3-6) to a work station. The articles 14 are of any suitable type having opposite side surfaces lying in substantially parallel planes with one surface provided with an indentation or recess 15 of greater depth than the other surface. An exemplary article 14 to be fed to the work station is a button having a substantially flat planar surface on one side and an irregular non-planar surface on the opposite side caused by central circular recess 15. The button is fed properly oriented to the work station with its flat substantially planar surface facing down and in position to be sewed onto a shirt or the like.

The article feeding mechanism of this invention has an article transport means, and means including gravity for automatically loading an article 14 into the article transport means at a loading station (FIG. 2). The mechanism further has a sensing station where the orientation of the transported articles is sensed, an unloading station where properly oriented articles are unloaded and fed to the work station, and a relinquishing station where improperly oriented articles are released and returned to the loading station. More specifically, the mechanism comprises a base 16 (FIG. 1), and a cylindrically shaped housing 18 having an edge thereof hinged by any suitable hinge 20 to the base. The housing 18 can be tilted to any suitable angle relative to the base and held in such position by any suitable means. Such means can comprise a pivotal leg 22 hingedly secured at one end to housing 18, and having its free end selectively engaging a projection 24 on base 16. In the alternative, the housing 18 can be provided with any suitable adjustable support, not shown, such as a depending flange at one edge thereof pivotally mounted on a threaded pivot pin supported by a yoke on the base. The pivot pin can be provided with a wing nut or the like for clamping the flange to the yoke for releasably securing the housing in any desired angular position.

An electric motor 26 of any suitable type is mounted within housing 18 and secured thereto by any suitable support plates 28. A work table in the form of a circular disc 30 is secured to motor shaft 32 for rotation, and the periphery of the disc is surrounded by the open end of housing 18. The outer surface of disc 30 is serrated to prevent articles from adhering thereto due to static electricity. The disc is further provided with a peripheral ring 34 of a thickness substantially equal to the thickness of an article. The ring 34 is provided with a plurality of recesses or pockets 36 (FIG. 2) angularly spaced along the ring for receiving articles 14. A hood 38 is secured to housing 18 and cooperates with circular disc 30 to provide a supply hopper for articles at the loading station. In opertion, housing 18 is adjusted with disc 30 inclined to the horizontal, and the supply hopper is filled with articles in random orientation. Upon rotation of disc 30 by motor 26, articles 14 enter pockets 36 in proper and improper orientation under the influence of gravity, and are transported through the sensing station to the unloading or relinquishing stations.

Each of the pockets 36 of disc 30 are provided with a sensing mechanism 40 for sensing the orientation of an article in the pocket at the sensing station. The sensing mechanism 40, as best illustrated in FIGS. 6-8, each comprise a plate 42 having one end hinged to the under surface of disc 30. The plate 42 is further provided with a pair of laterally extending inner and outer fingers 44, 46 respectively extending through inner and outer tapered openings 48 in disc 30 within the pocket area. The inner opening 48 is substantially at the center of pocket 36 and properly located so that inner finger 44 is in register with a recess 15 of any one of at least three different sized articles as best illustrated in FIGS. 3-5, and explained in greater detail later on. The outer opening 48 is located at the mouth of pocket 36 and outside of the periphery of any of the articles 14 acceptable by the pocket. Accordingly, outer finger 46 when extended through outer opening 48 blocks the mouth of pocket 36 and prevents any article from falling out of the pocket. Since plates 42 are hinged at 50 to the bottom of disc 30, they are normally held under the influence of gravity in an open position as seen in FIG. 1. In this position, fingers 44, 46 are retracted from pockets 36 and the pockets are free to accept an article 14 at the loading station. The disc 30 is rotatably driven in a clockwise direction and transports an article 14 picked up by a pocket 36 to the sensing station (FIG. 2). At the sensing station, an article retaining plate 52 is provided secured to housing 18. A plastic sheet of teflon 54 or the like is interposed between plate 52 and housing 18 to form a back-stop for slidably engaging the outer surface of an article 14 and retaining it in pocket 36 as best seen in FIG. 6. In addition, housing 18 is provided at the sensing station with a spring 56 properly positioned to engage and urge plate 42 of each of the sensing mechanisms in the sensing station to an extended position, in which fingers 44, 46 enter the pocket.

If an article 14 is properly oriented in pocket 36 at the sensing station as illustrated in FIG. 6, the substantially flat planar lower surface thereof prevents inner finger 44 from entering the pocket and retains plate 42 in its retracted position against the bias of spring 56. Upon further advance of the article, the free end of plate 42 passes underneath the tapered end of a holding plate 58 mounted on plate 28 at the unloading station. The holding plate 58 continues to hold sensing plate 42 in its retracted position during movement of the article 14 from the sensing station through the unloading station (FIG. 2). Accordingly, at the unloading station, the properly oriented article is free to slide, under the influence of gravity, into a funnel-shaped chute 60, and thence through a flexible guide tube 62 to any suitable work station in proper orientation.

If an article 14 is improperly orientated in pocket 36 at the sensing station as illustrated in FIG. 7, spring 56 biases plate 42 of the sensing mechanism into its extended position. In this position, inner finger 44 enters recess 15 in the article, and outer finger 46 blocks the mouth of pocket 36. Forward advance of disc 30 causes the free end of sensing plate 42 to pass on the opposite side of holding plate 58 which continues to hold the sensing mechanism in its extended position as article 14 is transported through the unloading station. Accordingly, during passage through the unloading station, the improperly oriented article 14 is prevented from falling out of pocket 36 by outer finger 46 blocking the mouth of the pocket. Conceivably, by proper design the inner finger 44 extending into recess 15 can prevent the article from falling out of the pocket. Following passage of the article through the unloading station and into the relinquishing station, the sensing plate 42 is no longer held by holding plate 58. Accordingly, sensing plate 42 drops by gravity to its retracted position retracting fingers 44, 46 from pocket 36. Retraction of the fingers allows the improperly oriented article 14 to slide by gravity along the disc surface back into the supply hopper.

In summary, during operation of the article feeding mechanism, the work table or disc 30 is rotated at any suitable desired speed for continually picking up articles 14 in pockets 36 in proper or improper orientation at the loading station. The articles are transported singly through the sensing station where the orientation of the article is sensed. If the article is properly oriented, it is fed from pocket 36 into chute 60 at the unloading station. If the article is improperly oriented, it is transported through the sensing and unloading stations to the relinquishing station. At this latter station, the article is released and is returned to the supply hopper under the influence of gravity.

If the free end of sensing plate 42 should strike the tapered end of holding plate 58 rather than pass on either side, damage may occur to the sensing mechanism, and or holding plate. To prevent such damage, holding plate 58 is pivotally mounted on a post 64 and held in its normal operating position (FIG. 2) by a spring 65 so that disc 30 and sensing plate 42 can continue to move. The sensing plate 42 merely pivots holding plate 58 out of the way against the bias of its spring which then returns holding plate to its normal position against any suitable stop following passage of sensing plate 42. Any article 14 in pocket 36 will be retained therein by the partially extending fingers 44, 46 and carried through the loading station and unloaded at the relinquishing station.

The sensing mechanism is capable of sensing similar articles 14 of at least three different sizes without any necessity for modifying the feeding mechanism. This is possible because such articles all have a common recessed area for receiving inner finger 44. For example, with a button 14 of one size as illustrated in FIG. 3, no matter what position the button assumes in pocket 36, a central recessed area is in register with inner finger 44. With a slightly larger button 14 illustrated in FIG. 4, a central recessed area in all positions of the button is in register with inner finger 44. With the largest size button 14 illustrated in FIG. 5, the central recessed area 15 thereof is clearly in register with inner finger 44. Accordingly, for all three sizes of buttons 14, when such buttons are in pocket 36 in an improper orientation (central recess 15 down), inner finger 44 extends into recess 15 and in conjunction with outer finger 46 retains the button in the pocket during passage through the unloading station.

Figure 10:
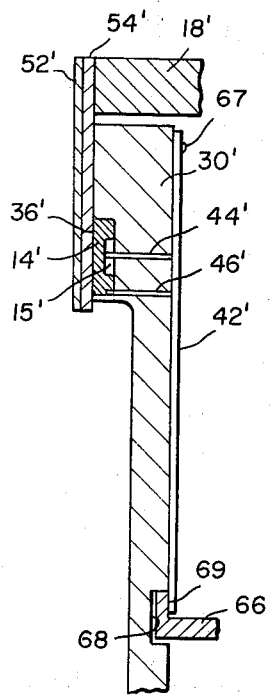
FIG. 10 is a view similar to FIG. 6 illustrating the sensing mechanism sensing a properly oriented article at the sensing station.
Figure 11:
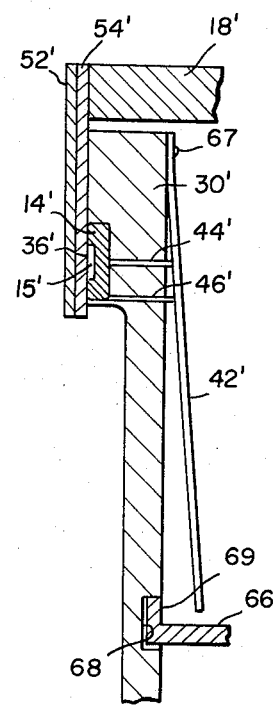
FIG. 11 is a view similar to FIG. 7 illustrating the sensing mechanism sensing an improperly oriented article at the sensing station.
Figure 12:
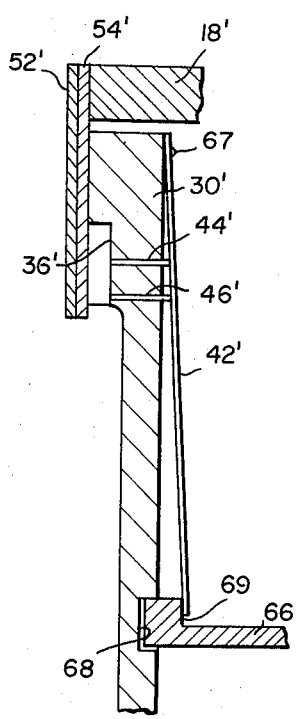
FIG. 12 is a view similar to FIGS. 9 and 10 illustrating the sensing mechanism at all stations other than the sensing and unloading stations.

In the modification of the sensing mechanism illustrated in FIGS. 9-12, parts similar to previously illustrated parts will be denoted by the same numerals primed. This modification is essentially the reverse of the sensing mechanism illustrated in FIGS. 6-8; that is the sensing mechanism is normally spring biased into its extended position and is cammed out to its retracted position. The sensing mechanism comprises a spring plate 42' having one end riveted at 67 to the undersurface of disc 30' adjacent its periphery. The plate 42' is biased by its normal resilience into its extended position as seen in FIG. 11 with fingers 44', 46' extending into pocket 36'. The feeding mechanism is provided with a cylindrical camming rail 66 having one end secured by any suitable means to plate 28' or to the housing, and its other end extending into an annular recess 68 in disc 30'. The rail 66 is properly positioned and its cam surface 69 is properly designed to cooperate with the free end of spring plates 42' upon rotation of disc 30' to cam the spring plates into their retracted position (FIG. 12) at all stations of the mechanism except the sensing and unloading stations. At the latter stations, cam surface 69 allows each spring plate 42' to move to its extended position as seen in FIG. 11 unless prevented by a properly oriented article (FIG. 10). The extended or retracted position of plate 42' as it travels through the unloading station is controlled by holding plate 58' as described heretofore.

The invention has been described in detail with reference to preferred embodiments thereof, but it will be understood that variations and modifications can be effected within the spirit and scope of the invention as described hereinabove.

I claim:

1. In an article feeding mechanism for feeding articles of the type having a substantially planar surface on one side and a non-planar surface on the opposite side, the combination comprising:

a movable work table having at least one article receiving pocket which is movable successively through loading, sensing and unloading stations, said pocket having an article supporting surface;

means for loading an article in said pocket in random orientation at said loading station, said article being properly oriented in said pocket when said substantially planar surface is in engagement with said supporting surface, and improperly oriented when said non-planar surface is in engagement with said supporting surface;

sensing means associated with said pocket and movable between a retracted position in which a part of said sensing means does not extend through said supporting surface into said pocket, and an extended position in which said part extends through said supporting surface into said pocket to prevent an article in said pocket from escaping;

means at said sensing station on one side of said supporting surface for retaining an article in said pocket;

means at said sensing station on the opposite side of said supporting surface for biasing said sensing means to its extended position when an article is missing from said pocket or improperly oriented in said pocket;

said part of said sensing means adapted to engage said substantially planar surface of a properly oriented article at said sensing station to prevent movement of said sensing means to its extended position by said biasing means; and holding means at said unloading station adapted when said sensing means is in its retracted position at said sensing station to releasably hold said sensing means in its retracted position while said pocket is moved through said unloading station whereby a properly oriented article is free to be fed from said pocket, and adapted when said sensing means is moved to its extended position at said sensing station to releasably hold said sensing means in its extended position while said pocket is moved through said unloading station whereby an improperly oriented article in said pocket is retained therein for passage through said unloading station.

2. The invention according to claim 1 wherein said part of said sensing means comprises a projection movable into and out of said pocket, and said biasing means comprises resilient means for biasing said projection into said pocket.

3. The invention according to claim 1 wherein said pocket has an opening extending therethrough, and said part of said sensing means comprises a pin slidably movable within said opening into and out of said pocket, and said biasing means comprises resilient means for biasing said pin into said pocket.

4. The invention according to claim 1 wherein said pocket has a mouth and a pair of openings extending through said pocket and said mouth, and said part of said sensing means comprises a pair of pins slidably movable within said openings into and out of said pocket and said mouth, and said biasing means comprises resilient means for biasing said pins into said pocket and mouth.

5. The invention according to claim 4 wherein said sensing means comprises a pivotal plate having a free end, said pins are secured to said plate, and said holding means comprises a guide blade for guiding said free end on one side of said blade for releasably holding said sensing means in its retracted position, and on the other side of said blade for releasably holding said sensing means in its extended position.

6. The invention according to claim 5 wherein said guide blade is pivotally mounted.

7. The invention according to claim 1 wherein said movable work table comprises a circular rotatably driven disc, said loading means comprises a hood cooperating with said disc to form a supply hopper for articles through which said disc is driven, said part of said sensing means comprises a projection movable into and out of said pocket in said disc, and said biasing means comprises resilient means for biasing said projection into said pocket.

8. The invention according to claim 1 wherein said movable work table comprises a circular rotatably driven disc inclined at an angle to the horizontal, said loading means comprises a hood cooperating with said disc to form a supply hopper for articles through which said disc is driven, said part of said sensing means comprises a projection movable into and out of said pocket in said disc, and said biasing means comprises resilient means for biasing said projection into said pocket.

9. The invention according to claim 8 wherein said pocket has an opening extending therethrough, and said projection of said sensing means comprises a pin slidably movable within said opening into and out of said pocket.

10. The invention according to claim 1 wherein said movable work table comprises a circular rotatably driven disc inclined at an angle to the horizontal, said pocket in said disc has a mouth and is provided with a pair of openings extending through said pocket and mouth, said loading means comprises a hood cooperating with said disc to form a supply hopper for articles through which said disc is driven, said part of said sensing means comprises a pair of pins slidably movable within said openings into and out of said pocket and said mouth, and said biasing means comprises resilient means for biasing said pins into said pocket and said mouth.

11. The invention according to claim 10 wherein said sensing means comprises a pivotal plate having a free end, said pins are secured to said plate and laterally extending therefrom, and said holding means comprises a guide blade for guiding said free end on one side of said blade for releasably holding said sensing means in its retracted position, and on the other side of said blade for releasably holding said sensing means in its extended position.

12. The invention according to claim 11 wherein said guide blade is pivotally mounted.

13. The invention according to claim 10 wherein said article feeding mechanism is further provided with an article back-up plate at said sensing station slidably engageable by one side of said article, said pins being biased by said resilient means toward the opposite side of said article.

14. The invention according to claim 1 wherein said sensing means comprises a pivotal plate having a free end, and said part of said sensing means comprises a pin secured to said plate.

15. The invention according to claim 1 wherein said sensing means comprises a spring plate having a free end, said part of said sensing means comprises a pin secured to said plate, and said biasing means comprises the inherent resilience of said spring plate.

16. The invention according to claim 1 wherein said sensing means comprises a spring plate having a free end, said part of said sensing means comprises a pin secured to said plate, and said biasing means comprises the inherent resilience of said spring plate, said mechanism further having cam means for camming said spring plate to its retracted position at said loading station.

17. The invention according to claim 1 wherein said movable work table comprises a circular rotatably driven disc inclined at an angle to the horizontal, said loading means comprises a hood cooperating with said disc to form a supply hopper for articles through which said disc is driven, said sensing means comprises a spring plate having a free end, said part of said sensing means comprises a pin secured to said plate, and said biasing means comprises the inherent resilience of said spring plate, said mechanism further having an annular cam interposed between said disc and said free end of said spring plate for camming said spring plate to its retracted position at all positions of said disc except said sensing and unloading stations, said cam permitting movement of said spring plate to its extended position at said sensing and unloading stations.

18. The invention according to claim 17 wherein said pocket in said disc has a mouth, and said pocket and said mouth have openings extending therethrough, and said part of said sensing means comprises a pair of pins secured to said plate and laterally extending therefrom and slidably movable within said openings into and out of said pocket and said mouth.

* * * * *